July 23, 1940.  J. GETTINGER  2,209,078
AIR COOLED INTERNAL COMBUSTION ENGINE
Filed April 18, 1938  3 Sheets-Sheet 2
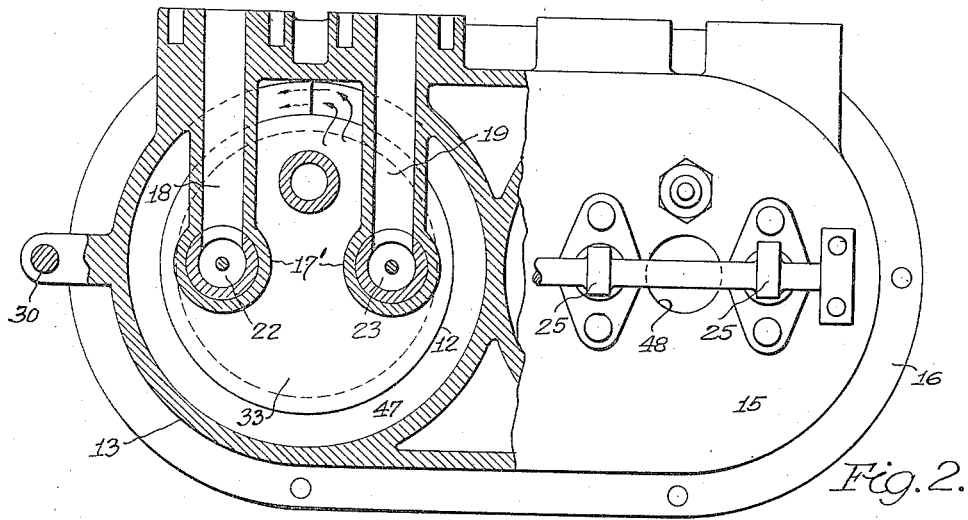
Fig. 2.
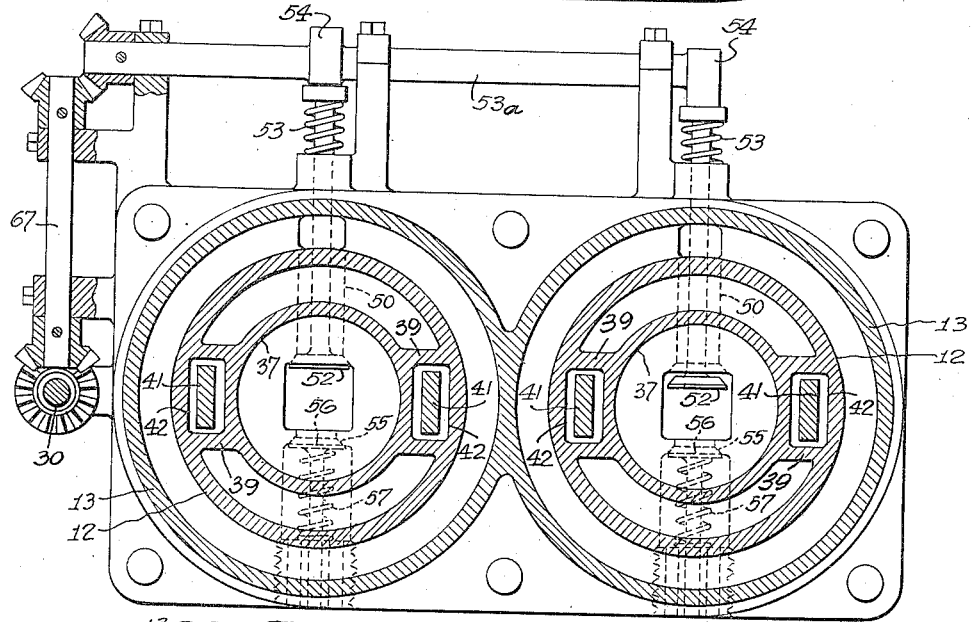
Fig. 3.
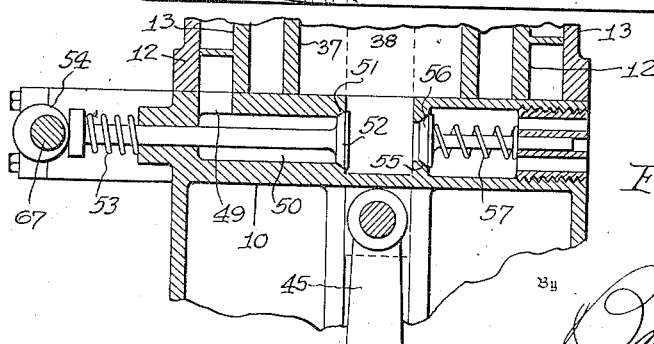
Fig. 4.
Inventor
Joseph Gettinger,
Attorneys July 23, 1940.　　　　J. GETTINGER　　　　2,209,078
AIR COOLED INTERNAL COMBUSTION ENGINE
Filed April 18, 1938　　　3 Sheets-Sheet 3
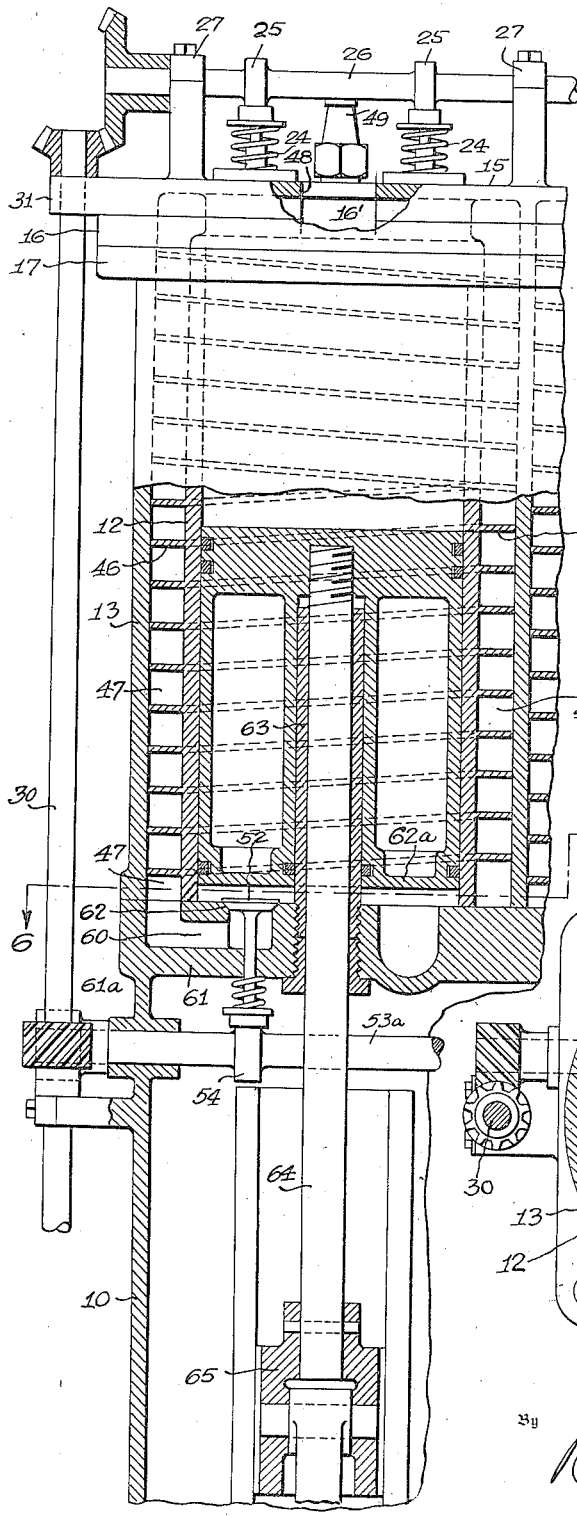
Fig. 5.
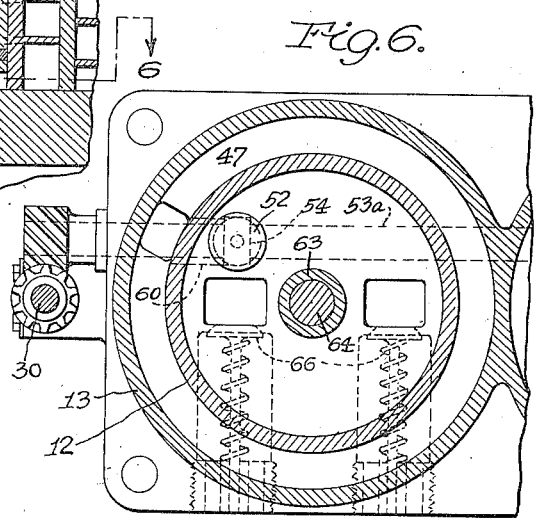
Fig. 6.
Inventor
Joseph Gettinger,
By
Attorneys Patented July 23, 1940

2,209,078

UNITED STATES PATENT OFFICE 2,209,078

AIR COOLED INTERNAL COMBUSTION ENGINE

Joseph Gettinger, Chicago, Ill.

Application April 18, 1938, Serial No. 202,645

3 Claims. (Cl. 123—171)

This invention relates generally to internal combustion engines and more particularly to air cooled internal combustion engines.

It is an object of the present invention to provide new and improved means to efficiently air cool internal combustion engines.

Another object of the invention is to provide for drawing relatively cold air into spiral ducts surrounding engine cylinders to cool the same and to intermittently draw air into the ducts by action of the engine pistons.

Other objects of the invention will become apparent from the following detailed description taken in connection with the accompanying drawings which form a part of this specification and in which Figure 1 is a fragmentary view shown in vertical central cross section of an internal combustion engine embodying my invention;

Fig. 2 is a plan view of the engine, partly broken away and in section, taken along the line 2—2 of Fig. 1;

Fig. 3 is a view of the engine shown partly in elevation and partly in cross section, taken along the line and in the direction of the arrows 3—3 of Fig. 1;

Fig. 4 is a fragmentary view of the engine showing certain details thereof and taken along the line 4—4 of Fig. 1;

Fig. 5 is a fragmentary view of an engine, partly broken away and in section showing a modified form of the invention, and Fig. 6 is a view shown in section taken along the line and in the direction of the arrows 6—6 of Fig. 5.

Figure 1:
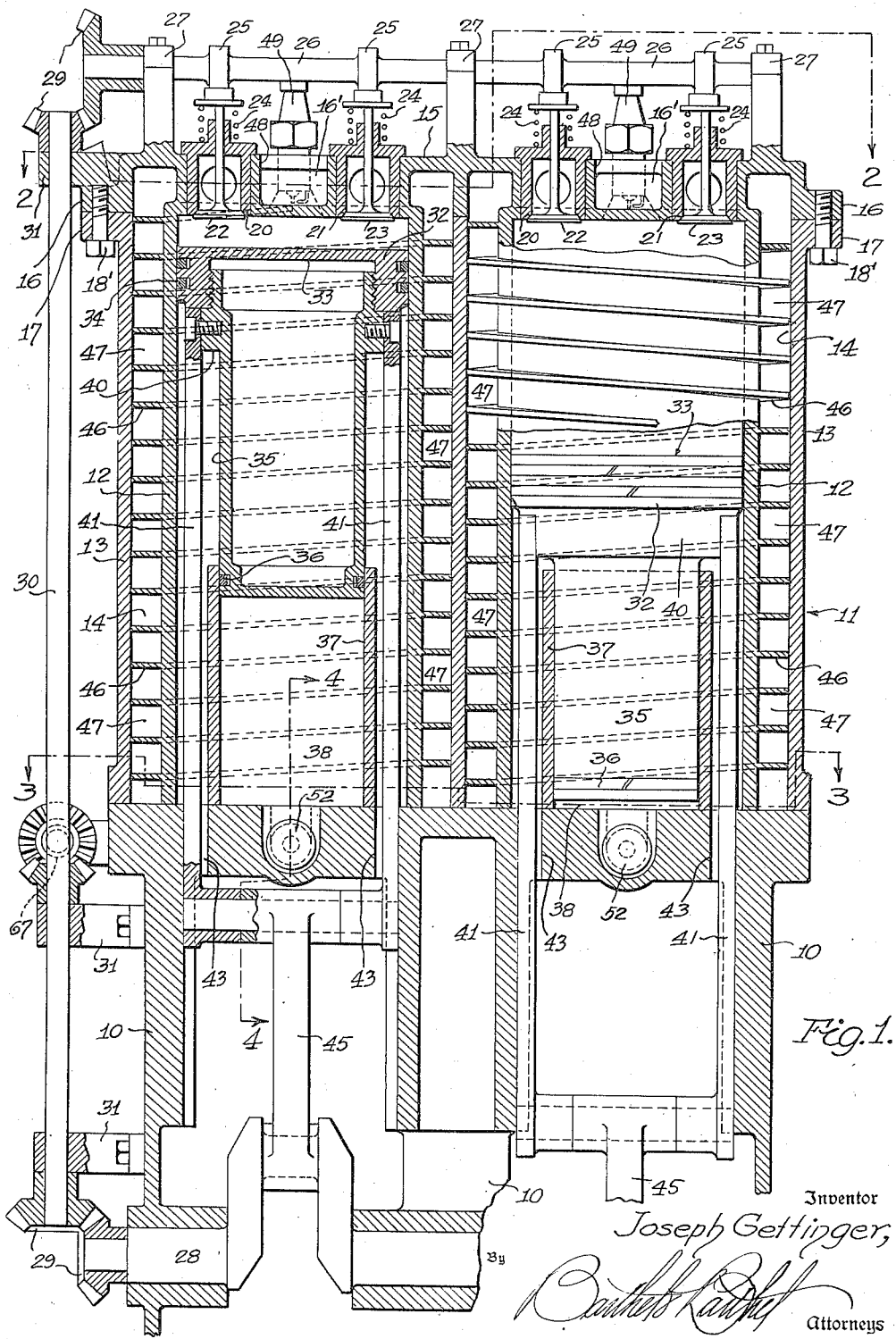

Referring to the drawings by characters of reference the internal combustion engine includes a crank case 10 in which an engine block or head 11 is mounted and rigidly secured thereto. The engine head 1 is provided with a plurality of cylinders 12 surrounded by walls or jackets 13 which are spaced from the outer walls of the cylinder 12 to provide annular spaces 14 therebetween, the several walls or jackets 13 preferably being cast integral. The cylinders 12 have a common top wall or head 15 which may be provided with outturned flanges 16 to seat on outturned flanges 17 of the cylinders, the flanges preferably having aligning apertures to receive screws 18' by means of which the cylinder casting and the jacket casting may be rigidly secured together.

In each of the cylinder heads 15 there is a chamber 16' and projecting into each chamber is a pair of bosses 17', integral with the cylinder head, in which are provided an intake passage 18 and an exhaust passage 19. The intake and exhaust passage 18 and 19 open into the cylinders 12 through valve ports 20 and 21 respectively, which are controlled by valve members 22 and 23 respectively. Extending through each of the cylinder chambers 16' is a spark plug screwthreaded into the top wall of the cylinders between the intake and exhaust valves thereof. The valves 22 and 23 may be biased toward their closed positions by helical coil springs 24 and may be operated by cams 25 on a cam shaft 26 which may be journaled in spaced bearing members 27 formed integral with and extending upwardly from the cylinder head 15. Journaled in the crankcase 10, a crankshaft 28 drives the cam shaft 26 through bevel gears 29 and a vertical shaft 30 which may be suitably journaled in bearings 31.

Each of the cylinders 12 has a piston 32, reciprocable therein, having a head 33 slidably engaging the cylinder wall, the piston head preferably being provided with suitable piston rings 34. Preferably, each piston is provided with a reduced lower end portion 35 having one or more piston rings 36 and these reduced portions have lower end walls and are slidably received in the upper ends of open ended sleeves or cylinders 37 with which the pistons cooperate to provide expansible suction chambers 38, one in each cylinder. The sleeves 37 are disposed within the cylinders 12 adjacent the lower ends, the sleeves and cylinders preferably being cast integral having spaced ribs or webs 39 joining them together, as shown in Fig. 3.

The pistons 32 are each provided with a lower end portion 40 having radially spaced integral upstanding connecting members 41 which are rigidly secured to the piston 32 by screws or by other suitable means, the connecting members 41 extending through apertures 42 provided in the webs 39 which joins the sleeves and the cylinders, Fig. 3. Preferably, the piston portions 40 are slidably received and guided in apertures 43 in the crankcase 10 and are connected at their lower ends to cranks 45 of the crankshaft 28.

In order to provide for air cooling the engine, I provide a spiral wall or fin 46 positioned one in each of the annular spaces 14 between the cylinders 12 and their jackets 13 with which the fin cooperates to provide a spiral duct or passage 47 leading downwardly from the chamber 16 which has an air inlet 48 in the top wall thereof adjacent the spark plugs 49. The spiral fins 46 surround and are in good heat transfer or heat conducting relation with the walls of the cylinders 12 and are also in good heat transfer relation with the jackets 13 which the outer edge of the fins contact. The fins 46 are preferably formed integral with the cylinders, projecting outwardly from the outer wall surfaces thereof, but if desired the fins may be formed integral with the jackets or they may be made as separate parts from the cylinders and jackets and suitably secured in place.

The spiral air ducts 47 open at their lower ends as, at 49, Fig. 4, into chambers 50 of which there is one for each cylinder provided in the top wall of the crank case 10, these chambers 50 communicating with the expansible suction chamber 38 through ports 51 which are controlled by reciprocal valves 52. The valves 52 may be biased toward closed position by suitable helical coil springs 53 and may be opened by cams 54, Fig. 4, on horizontal shafts 53' which may be driven through a shaft 67 which in turn is driven by the vertical shaft 30 through suitable bevel gears, the cams being adapted to open the valves 52 only on the upstroke of the pistons. Also connecting with each of the expansible suction chambers is an outlet port 55 to atmosphere, controlled by a pressure actuated valve 56 which may be biased toward closed position by a helical coil spring 57.

In operation of the engine, on the upstroke of the pistons 32, valves 52 are opened by the cams 54, establishing communication between the air flow ducts 47 and the expansible suction chambers 38. The pistons on the upstroke create a subatmospheric pressure in the chamber 38 and in the communicating air duct 47 inducing intake of relatively cold air through air inlet 48 and flow of the air downwardly through the spiral ducts 47 to cool the cylinder, jackets and the fins 46 which later serve as extended heat conducting surfaces. The air is drawn downward into the piston chamber 38 and on the down stroke of the piston valves 52 close and outlet valves 56 are forced open by the air pressure and discharged to outside atmosphere. It will thus be seen that air is intermittently drawn through the spiral ducts on the compression and exhaust strokes of the pistons and that on the suction and firing strokes of the pistons air flow through the ducts is stopped by reason of the closing of valves 52. This arrangement permits the air retained in the ducts to absorb heat during the firing and suction cycle after which the heated air is carried away to outside atmosphere by and on the down stroke of the pistons. If desired the heated air, instead of being discharged to outside atmosphere may be utilized in several ways for example, the air may be delivered to a compressor or to a heater etc. It will be understood that air is taken in at the top of the cylinders for air in this region will be relatively cool and thus heat transfer will be greater than would be the case if warmer air were employed. Also by providing the air intakes 48 adjacent the spark plugs, the spark plugs are also kept cool by the relatively cool air entering the air ducts.

Referring now to the modification shown in Figs. 5 and 6, in this instance, the cylinder head as at 60, has an integral bottom wall 61 provided with a chamber 61a communicating with the lower end of the duct 47 and having an upwardly facing port 62 which opens into the piston cylinder below the lower end of the piston. The piston has a lower end wall 62a which cooperates with the lower end portion of the cylinder to provide an expansible chamber into which the valve port 62 opens. The port 62 is controlled by the vertically reciprocal valve 52 and is opened by the cam 54 on the horizontal cam shaft 53a which is driven from the vertical shaft 30. Also the piston in Fig. 5 has a central and vertical bore to receive an open ended sleeve 63 which has its lower end screwthreaded into the bottom wall 61 of the cylinder head 60. Slidably received in the tubular guide or sleeve 63 is a connecting rod 64 connecting the piston to the crosshead 65. Preferably the engine of Figs. 5 and 6 is provided with two or more exhaust ports controlled by suction operated valves 66. The operation of the air cooled engine of Figs. 5 and 6 is substantially the same as the herein described operation of the air cooled engine of Figs. 1, 2, 3 and 4.

What I claim is:

1. In an internal combustion engine having a plurality of vertical cylinders provided with intake and exhaust valves, a cam shaft for operating said intake and said exhaust valves, jackets surrounding said cylinders in spaced relation thereto, a heat conducting fin surrounding each of said cylinders between said cylinders and their respective jackets in heat conducting relation thereto, each of said fins providing a single continuous helical passage for air to cool respective cylinders, said air passages having inlet openings to outside atmosphere adjacent the upper ends of the cylinders for the intake of relatively cool air, pistons in said cylinders, a crankshaft for actuating said pistons, outlets for said passages and leading respectively into said cylinders below said pistons, valve means controlling said outlets, said pistons being operable on the upstroke thereof to create a subatmospheric pressure therebelow in said cylinders to induce flow of air downwardly through said passages, air outlets for said cylinders below said pistons and leading directly to outside atmosphere, pressure responsive valve means controlling said outlets in accordance with operation of said pistons and means operatively connecting said crankshaft, cam shaft and said second-named valve means.

2. In an internal combustion engine, a cylinder, a jacket surrounding said cylinder in spaced relation thereto, said cylinder at its upper end having a chamber communicating with said jacket and having an air inlet to outside atmosphere, inlet and outlet valves extending through said chamber and control ports in the upper end of said cylinder, a helical fin surrounding said cylinder in the space between said cylinder and said jacket, said fin being in contact with the walls of said cylinder and said jacket for good heat transfer therebetween and cooperating to provide a single continuous passage, said passage communicating with said chambers and leading therefrom downwardly toward the lower end of said cylinder, said passage communicating with said cylinder adjacent the lower end thereof and having an outlet to outside atmosphere, a piston in said cylinder operable on its upstroke to create a subatmospheric pressure to induce downward flow of air through said passage, valve means controlling said passage and operated in accordance with operation of said piston to establish communication between said passage and said cylinder on the upstroke of said piston, and valve means controlling said outlet and operated by and in accordance with operation of said piston to open said outlet on the downstroke of said piston and means operatively connecting said valve means and the piston operating means.

3. In an internal combustion engine, a cylinder having an upper portion of relatively large diameter and a lower portion of relatively small diameter, a piston having an upper portion thereof slidably received in said relatively large cylinder portion and a reduced portion slidably received in said relatively small cylinder portion, said reduced portion and said relatively small cylinder portion co-operating to provide an expansible chamber, an outlet for said chamber and leading directly to outside atmosphere, duct means surrounding said cylinder in good heat conducting relation thereto, said cylinder having a chamber at its upper end opening to outside atmosphere and communicating with the upper end of said duct means, an outlet for said duct means and leading into said expansible chamber, valve means controlling and operable to close said second-named outlet on the intake and firing strokes of said piston, means to operate said piston and said valve means, and valve means responsive to pressure in said chamber for controlling said first-named outlet and biased toward closed position, said second-named valve means operating to open said first-named outlet on the compression and exhaust strokes of said piston.

JOSEPH GETTINGER.